Feb. 21, 1967

C. L. HALL 3,305,250

VACUUM JOINT

Filed June 29, 1964

INVENTOR.
CHARLES L. HALL

BY  *Leon F. Herbert*
ATTORNEY

United States Patent Office 3,305,250
Patented Feb. 21, 1967

3,305,250
VACUUM JOINT
Charles L. Hall, Palo Alto, Calif.
(20690 Homestead Road, Cupertino, Calif. 95014)
Filed June 29, 1964, Ser. No. 378,833
8 Claims. (Cl. 285—106)

This invention relates to joint structures and more particularly to demountable high-vacuum joints capable of withstanding high temperature bakeout.

The field of vacuum techniques is becoming an increasingly important aspect of modern technology. For many years high-vacuum systems have been employed in the manufacture of electron tubes. More recently, many new applications have been developed, such as vacuum cutting, welding, formation of exotic metals, and simulation of conditions to be encountered in outer space. These and other uses for vacuum systems all normally require the same essential features in a vacuum joint to connect together the various parts of the vacuum system. More specifically, a vacuum joint is desired which is easy to connect and disconnect and yet will form a high vacuum seal which can withstand high temperatures.

Numerous designs have already been proposed for vacuum joints and several have been developed to the point of providing commercially available structures which can be used to obtain vacuum-tight joints.

All joint structures of the type with which this invention is concerned comprise two joint members, usually in the form of flanges, having opposing sealing surfaces, and means for forcing the flanges together to compress a ring-shaped sealing gasket.

By far the most widely accepted prior constructions comprise some type of edge or projection on each flange which bites into the adjacent flat face of the sealing gasket. Another proposed type of construction does not employ edges or projections which bite into the gasket ring, and instead engages the gasket with sloping walls which exert a radial as well as an axial compressive force on the gasket ring. This latter type also includes an axial wall which engages the inner or outer rim of the ring which is opposite the rim engaged by the sloping walls. In addition, numerous designs have been proposed which involve gasket rings which instead of having the usual rectangular cross section have some special cross section shape which is normally associated with a specially shaped annular groove in each of the opposing flanges.

The previously mentioned type of joint structure which has projections or edges that bite into the flat faces of the gasket ring involves a number of inherent problems. One such problem arises from the fact that the face surfaces of the gasket rings normally sustain various nicks and scratches during the required handling processes from their inception as sheet stock at the mill until they are die-cut into gaskets. In addition, in the biting type of joint construction it is normally relatively difficult to remove the sealing ring after bakeout because some biting edge or projection is indented into the gasket. Further, the biting edge type of construction requires that the line along which the biting force is applied be substantially removed radially from the compressing means (normally in the form of a ring of bolts). Such displacement of the sealing line from the compressing means introduces appreciable bending and thereby decreases the compressive load which produces a vacuum-tight seal.

The previously mentioned type of joint structure which has tapered forcing surfaces and an axial retaining wall suffers from the problem that the dimensioning of the axial wall and the adjacent side of the gasket must be carefully maintained in order to serve the purpose of restraining the gasket. Also, after a seal has been made, it is difficult to remove the sealing gasket because of the cylindrical contact surface between the gasket ring and the axial restraining surface.

The previously mentioned type of joint structure which involves a gasket ring of special non-rectangular cross sectional shape involves a variety of problems depending upon the specific cross sectional shape under consideration. In addition, all of the designs suffer from the problem of making and distributing specially shaped gaskets.

It is an object of the present invention to provide an improved vacuum joint construction which does not suffer from the problems associated with the previously mentioned prior types of vacuum joints.

More specifically an object of the present invention is to provide a vacuum joint construction capable of generating a high unit sealing pressure on the gasket and at the same time permitting relatively easy removal of the sealing gasket when the joint is disconnected.

Another object of the invention is to provide a vacuum joint structure which obtains the preceding objectives with a gasket ring having a simple rectangular cross section. A related object of the invention is to provide a joint structure wherein the sealing contact with the gasket ring is not made with the damage-vulnerable flat faces of the ring.

An additional object of the invention is to provide a vacuum joint structure which will provide maximum restraint for the gasket ring to prevent the ring from yielding or flowing after the passage of time or the application of substantial heat. If it is not checked, such yielding or flowing will dissipate the sealing pressure and cause the joint to leak.

A further object of the invention is to provide a vacuum joint construction which prevents the formation of gas pockets within the joint structure.

Another object of the invention is to provide a vacuum joint structure which permits the ring of sealing contact between the gasket and flanges to be located closely adjacent the means for forcing the sealing flanges toward each other.

An additional object of the invention is to provide a vacuum joint structure wherein it is easy to locate the gasket ring quickly in the specific position it should occupy between the sealing flanges.

By way of brief description a preferred construction for accomplishing the objectives of the invention comprises sealing members having opposing surfaces in which an annular groove is formed. The side walls of each of the grooves have inside surfaces which are inclined toward each other. A gasket ring of rectangular cross section is receivable between the sealing members with the four edges of the ring in contact with said inclined surface, and a vent and removal slot is provided in one of the side walls of each of the grooves.

The preceding objects, together with other objects and features of advantage will be more apparent from the following detailed description wherein reference is made to the accompanying drawings in which.

Figure 1:
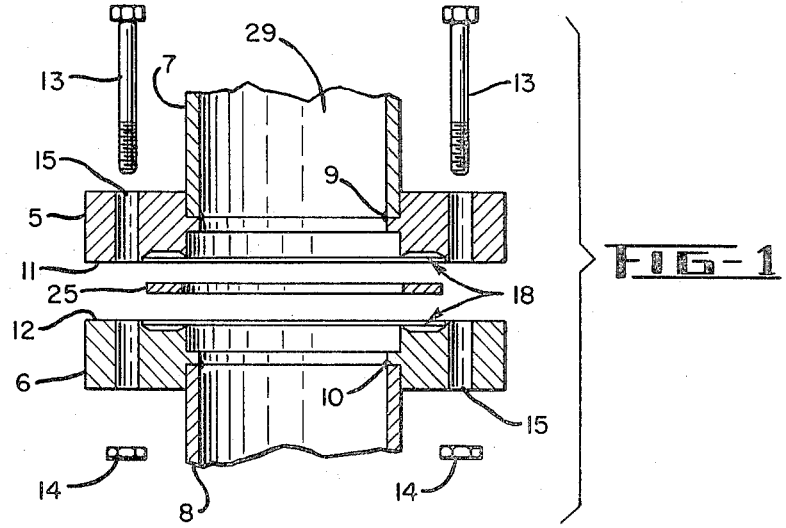
FIG. 1 is an exploded cross sectional view of a vacuum joint structure according to the invention.
Figure 2:
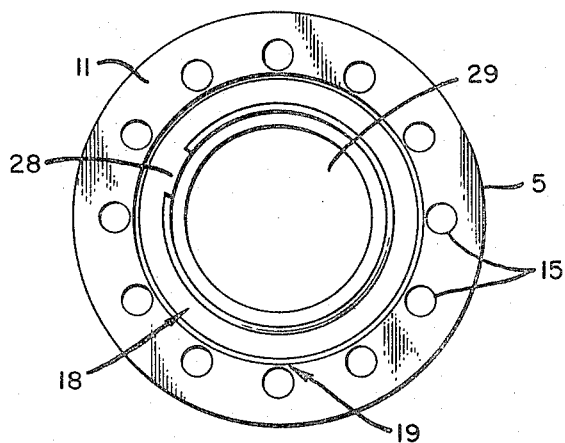
FIG. 2 is a plan view of the top of the lower sealing member shown in FIG. 1.

Referring in more detail to the drawings the joint structure comprises two joint members or flanges 5 and 6. The flanges are connected to their respective parts which are to be joined together in a vacuum tight system. In the example shown in the drawings the flanges 5 and 6 are connected to lengths of pipe 7 and 8 permanently sealed in place by welds 9 and 10.

The flanges 5 and 6 have flat annular opposing end surfaces 11, and 12, and means are provided for forcing these surfaces toward each other. In the specific example shown the forcing means is in the form of bolts 13 and nuts 14 which are employed in a circular array of bolt holes 15 in the flanges.

In order to form a vacuum tight seal when the flanges 5 and 6 are forced toward each other by tightening the bolts, each of the surfaces 11 and 12 is provided with an annular groove 18. Each of the grooves has its side walls 19 and 20 shaped so that the inside surfaces of the side walls are inclined toward each other. In the preferred example shown in the drawings, the inclined wall arrangement is in the form of flat sloping surfaces 21 and 22. However, as will be explained in more detail hereinafter the surfaces 21 and 22 can achieve certain benefits of the invention with other shapes such as concave or convex, as long as they have portions inclined toward each other for engagement by the edges of a rectangular gasket 25. It will be noted that each groove 18 has, in addition to the sloping portions 21 and 22, a flat bottom portion 26 and a shoulder portion 27 which is parallel to the axis of the joint structure. It should also be noted that the inner wall 20 of each of the grooves 18 has a discontinuity or slot 28 therein which connects the groove to the bore 29 extending axially through the center of the joint structure.

Figures 3, 4:
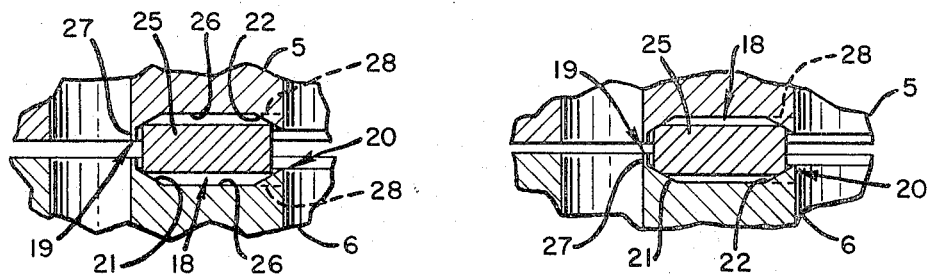
FIG. 3 is an enlarged cross sectional view of the gasket ring and local portions of the sealing members after the sealing members have been closed just enough to make initial contact with the gasket ring.
FIG. 4 is a view similar to FIG. 3 but showing the arrangement after the sealing members have been forced together to form a vacuum tight seal.

The previously described joint structure is used in the following manner. The gasket ring 25 is placed against one of the opposing surfaces 11, 12 and moved into positioning engagement with the shoulder 27. It should be understood that shoulder 27 is merely to locate the gasket during initial positioning and is not to restrain the gasket for the purpose of preventing yielding or flowing of the gasket. Thus, as shown in FIG. 4, the gasket can be slightly spaced from shoulder 27 even after sealing compression has been applied. In other words, the shoulder 27 is not required to obtain a vacuum tight seal. Instead, the purpose of the shoulder is to provide a positive locating abutment to permit quick and easy initial location of the gasket ring. Once the initial location of the gasket in the grooves is obtained, the symmetry of the grooves will assure the precise alignment of the gasket. The function of the shoulder 27 is enhanced by making the surfaces 11 and 12 at higher elevation from the bottom of their adjacent groove 18 on the side of the groove adjacent the shoulder than it is on the other side of the groove so that the shoulder will in effect form a projection which can be easily engaged.

As will be seen in FIG. 3, the sealing contact between the gasket 25 and the flanges 5 and 6 is solely on the edges of the gasket ring. In this way the area on which the force of bolts 13 is applied to the gasket is at a minimum so that the unit sealing pressure is at a maximum. In addition it will be noted that the sealing contact is not on the flat faces of the gasket 25. It has been realized in accordance with this invention that the surfaces of the sheet from which gaskets are finally punched are exposed from the time the sheet leaves the rolls and are normally scratched profusely by the time the sheet has reached the gasket-making stage. Immediately before punching out the gaskets, however, the surfaces are normally coated with adhesive paper. The gaskets are then punched out and packaged. Henceforth they are well protected from abuse, and the edges remain in good condition to provide perfect unmarred sealing surfaces.

It should be noted that through the use of the four inclined surfaces formed by the walls of the two grooves, the gasket ring is fully restrained to resist yielding away from the sealing forces. At the same time the gasket is easy to remove after compression because there is no axial restraining surface against which the gasket has been wedged during compression. In addition, the fact that the gasket is sealed on its edges and does not make contact between its face and the bottom of grooves 18 results in a minimum area of contact between the gasket and the flanges to further reduce the sticking effect.

Another important feature of the invention relates to the slot or discontinuity 28 in the wall 20 of each of the grooves. One purpose and benefit of the slot 28 is to vent the gas from the pocket between the bottom of each groove 18 and the adjacent face of the gasket 25.

The reason for venting the gas pockets is that there is a sealing action along both the inner and outer edges of the gasket ring 25. However, since the inner edge is so much farther from the compressing bolts, it normally forms an incomplete and unreliable seal. Nevertheless the inner edge of the gasket forms a sufficient seal to prevent rapid evacuation of the gas pockets in the grooves. If it were not for slots 28, gas from the pockets would slowly diffuse into the system to interfere with the desired high vacuum condition. The slots make it possible to pump out the pockets quickly during the initial evacuation of the system. In addition, the joint structure would give erroneous readings during leak checking if it were not for the slots 28. Thus, if there were a leak in the primary seal at the outer edge of the gasket, the detection gas from the outside of the joint would first have to find its way through the leak, and then it would have to find its way to and through minute passages through the line of contact between the inner edges of the gasket ring and the inner inclined surfaces. The time lag is inherently so great that the leak will not be detected.

Insofar as the venting purpose is concerned, the passageway could be located and shaped other than as shown for slot 28 as long as it connected the pocket at the bottom of the groove with the internal bore 29. In its preferred location as shown in the drawings, slot 28 serves the additional purpose of permitting a screw driver or other instrument to be inserted under the gasket to lift a used gasket out of the groove.

It is also important to note that the simple use of the inclined walls 21 and the outer edges of the gasket as the sealing surfaces makes it possible to position the ring of sealing contact closely adjacent the ring of bolts or other suitable means for forcing the flanges together.

Although specific details of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A vacuum joint structure comprising two joint members providing an internal evacuation space, each of said joint members having an end surface, means for forcing said end surfaces toward each other, each of said end surfaces having an annular groove therein positioned radially outward of said internal space, each of said grooves having its bottom wall disposed substantially parallel to the end surface and its side wall surfaces inclined toward each other in a direction making them closest together at the bottom of the groove, an annular sealing gasket having a rectangular cross section and receivable in said annular grooves with the four edges of the rectangle in contact with said inclined wall surfaces, said annular grooves being sufficiently deep that when said joint members are forced together by said forcing means said sealing gasket does not engage the bottom of either of said grooves, said sealing gasket being substantially solid across its face surfaces whereby the force exerted against the radially outer edges of the gasket is transmitted across the gasket and resisted by the force exerted against the radially inner edges of the gasket, and said joint structure having a passageway connecting the bottom of each of said annular grooves with said internal space in substantially the same plane as said sealing gasket.

2. A vacuum joint structure as claimed in claim 1 in which one side wall surface of one of said annular grooves has a straight cylindrical portion adjacent the end surface of its respective joint member and intersecting the adjacent inclined surface of the annular groove, said passageway is formed in each joint member by a slot in said end surface of the joint member, and said slot extends radially through the radially inner wall of the annular groove, whereby a removal tool can be inserted through said slot and under the gasket to remove the gasket.

3. A vacuum joint structure comprising:
two annular joint members having opposed end surfaces and an internal bore therethrough defining a vacuum passage through said joint structure;
means forcing said end surfaces towards each other;
each of said end surfaces having formed therein a substantially identical annular recess defined by a pair of oppositely inclined walls connected by a bottom wall which is of less extent than the distance between the points of intersection of said inclined walls with said end face;
an annular sealing gasket of substantially rectangular cross section having a long side which is of greater width than the extent of said bottom wall, said sealing gasket being received in each of said annular recesses when said joint is made up with a said long wall lying opposite a respective said bottom wall whereby a space is defined between said long walls and said bottom walls and whereby a line contact is had between all four corners of said gasket and the inclined walls of said annular recesses, at least the line contact between the outer corners of said gasket and the outer inclined walls of said annular recesses being a sealing contact; and
means forming a vent passage between said spaces and said vacuum passage.

4. A vacuum joint structure in accordance with claim 3 in which the line contact between the inner corners of said gasket and the inner inclined walls of said annular recesses is also a sealing contact.

5. A vacuum joint structure in accordance with claim 3 in which the means for forming said vent passage comprises a radial recess formed in the end surface which extends from said vacuum passage through the inner inclined wall of said annular recess into said space.

6. A vacuum joint structure in accordance with claim 3 in which the end surfaces of said joint members are flat and disposed parallel to one another.

7. A vacuum joint structure in accordance with claim 6 in which said bottom wall is substantially flat and substantially parallel to the end surface in which it is formed.

8. A vacuum joint structure in accordance with claim 3 in which the means for forming said vent passage comprises a slot in the end surface which extends radially through the inner inclined wall of said annular recess, said slot being dimensional to accommodate a gasket removal tool.

References Cited by the Examiner
UNITED STATES PATENTS

| | | | |
|---|---|---|---|
| 1,567,813 | 12/1925 | Oleson | 285—106 |
| 1,912,494 | 6/1933 | Patterson | 285—106 X |
| 2,456,081 | 12/1948 | Penick | 285—336 X |
| 3,144,035 | 8/1964 | Hablanian | 285—13 X |
| 3,181,897 | 5/1965 | Krayenbuhl | 285—106 X |
| 3,211,477 | 10/1965 | McCoy | 285—13 X |

FOREIGN PATENTS

| | | |
|---|---|---|
| 564,280 | 7/1958 | Belgium. |
| 1,022,894 | 12/1952 | France. |
| 507,468 | 10/1927 | Germany. |
| 931,045 | 8/1955 | Germany. |
| 508,288 | 1/1955 | Italy. |

CARL W. TOMLIN, *Primary Examiner.*